United States Patent
Ramprasad et al.

(10) Patent No.: US 9,258,714 B2
(45) Date of Patent: *Feb. 9, 2016

(54) BROADCAST REPLENISHMENT OF ACCOUNT PARAMETERS FOR GROUPS OF WIRELESS DEVICES

(71) Applicant: TracFone Wireless, Inc., Miami, FL (US)

(72) Inventors: Satish Ramprasad, Miramar, FL (US); Sergio Rivera, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,162

(22) Filed: Dec. 16, 2014

(65) Prior Publication Data

US 2015/0104018 A1 Apr. 16, 2015

Related U.S. Application Data

(63) Continuation of application No. 13/155,630, filed on Jun. 8, 2011, now Pat. No. 8,914,849.

(51) Int. Cl.
| | |
|---|---|
| *G06F 7/04* | (2006.01) |
| *H04K 1/00* | (2006.01) |
| *H04W 12/08* | (2009.01) |
| *H04L 29/06* | (2006.01) |
| *H04W 12/04* | (2009.01) |

(Continued)

(52) U.S. Cl.
CPC ............. *H04W 12/08* (2013.01); *H04L 9/0819* (2013.01); *H04L 63/065* (2013.01); *H04M 17/10* (2013.01); *H04W 4/06* (2013.01); *H04W 4/12* (2013.01); *H04W 4/24* (2013.01); *H04W 12/04* (2013.01); *H04L 63/104* (2013.01); *H04L 2209/24* (2013.01); *H04W 4/08* (2013.01)

(58) Field of Classification Search
None
See application file for complete search history.

(56) References Cited

U.S. PATENT DOCUMENTS

| | | |
|---|---|---|
| 5,359,642 A | 10/1994 | Castro |
| 5,774,535 A | 6/1998 | Castro |

(Continued)

FOREIGN PATENT DOCUMENTS

WO 01/60046 A1 8/2001

OTHER PUBLICATIONS

International Search Report of related application No. PCT/US12/41248 issued on Aug. 21, 2012.

*Primary Examiner* — Kaveh Abrishamkar
(74) *Attorney, Agent, or Firm* — Baker Hostetler LLP

(57) ABSTRACT

A system and method are provided for the broadcast replenishment of account parameters for select groups of wireless devices, where select groups of wireless devices have their internally-stored account parameters (e.g., prepaid amount of usage authorization) simultaneously updated as a group by a single broadcast message, such as an encrypted SMS message. An account update message is generated based on the account parameters to be updated and encrypted using an encryption key uniquely associated with the select group of wireless devices. The encrypted account update message is broadcast for receipt by the select group of wireless devices, such only those wireless devices previously provided with a key for decryption can receive and decrypt the broadcast account update message. The wireless devices use information and/or instructions in the broadcast message in order to update their internally stored account parameters accordingly.

20 Claims, 8 Drawing Sheets

(51) Int. Cl.
*H04L 9/08* (2006.01)
*H04M 17/00* (2006.01)
*H04W 4/06* (2009.01)
*H04W 4/12* (2009.01)
*H04W 4/24* (2009.01)
*H04W 4/08* (2009.01)

(56) References Cited

U.S. PATENT DOCUMENTS

| | | |
|---|---|---|
| 6,252,868 B1 | 6/2001 | Diachina et al. |
| 6,466,783 B2 | 10/2002 | Dahm et al. |
| 6,564,047 B1 | 5/2003 | Steele et al. |
| 6,622,017 B1 | 9/2003 | Hoffman |
| 6,654,600 B1 | 11/2003 | Pollak et al. |
| 6,934,529 B2 | 8/2005 | Bagoren et al. |
| 7,058,386 B2 | 6/2006 | McGregor et al. |
| 7,076,657 B2 | 7/2006 | Koukoulidis et al. |
| 7,218,912 B2 | 5/2007 | Erskine et al. |
| 7,245,901 B2 | 7/2007 | McGregor et al. |
| 7,272,382 B2 | 9/2007 | Servi et al. |
| 7,415,281 B2 | 8/2008 | Ahn |
| 7,444,141 B2 | 10/2008 | Rivera et al. |
| 7,558,578 B1 | 7/2009 | De Beer |
| 8,094,635 B2 | 1/2012 | Chin et al. |
| 8,699,993 B2 | 4/2014 | Ramprasad et al. |
| 8,914,849 B2 * | 12/2014 | Ramprasad et al. ............. 726/4 |
| 2004/0097220 A1 | 5/2004 | McGregor et al. |
| 2005/0100148 A1 | 5/2005 | Watkins et al. |
| 2005/0282559 A1 | 12/2005 | Erskine et al. |
| 2008/0119161 A1 | 5/2008 | Collart |
| 2008/0119162 A1 | 5/2008 | Sivalingam et al. |
| 2009/0063187 A1 | 3/2009 | Johnson et al. |
| 2009/0131023 A1 | 5/2009 | Lorello et al. |
| 2010/0069097 A1 | 3/2010 | Chin et al. |
| 2011/0106707 A1 | 5/2011 | Hwang et al. |

* cited by examiner

BROADCAST REPLENISHMENT OF ACCOUNT PARAMETERS FOR GROUPS OF WIRELESS DEVICES

CROSS-REFERENCE TO RELATED APPLICATIONS

This application is a continuation of the U.S. patent application Ser. No. 13/155,630, filed Jun. 8, 2011 now U.S. Pat. No. 8,914,849 issued Dec. 16, 2014, which is incorporated herein by reference in its entirety.

TECHNICAL FIELD

The present invention relates generally to the replenishment of account usage parameters internally stored within a wireless device and, more particularly, to the broadcast replenishment of internally stored account usage parameters for select groups of wireless devices.

BACKGROUND

Prepaid wireless service (e.g., cellular service) is a form of wireless service in which a user must pay in advance for use of the wireless service. Typically, a user purchases from a prepaid wireless service provider a definite amount of usage of a wireless network (e.g., number of airtime minutes, amount of data transfer, number of messages) at an initially pre-defined exchange of monetary value versus units of usage. These measures of units of usage have commonly been valued as minutes of usage of the wireless network in the case of airtime minutes. When the user places or receives a call from their wireless device or otherwise uses the service, the user's pre-purchased airtime minutes or other appropriate units of usage are deducted from the user's account. The rate at which pre-purchased units of usage are deducted per unit of usage is known as the deduct rate. Once the pre-purchased units of usage have been exhausted, the user is denied service until the user purchases additional units or the user's account parameters are otherwise replenished.

Certain prepaid wireless devices possess internal accounting capabilities that allow for real-time call debiting of account parameters that are solely maintained within the wireless device, where such wireless devices include an internal memory which stores the deduct rate and a billing algorithm that monitors usage of the wireless device and debits the internally stored account parameters accordingly. In this manner, all accounting operations associated with use of the wireless device are performed within the wireless device itself, as opposed to traditional cell phone billing platforms in which accounts are managed, tracked and billed by components on the network side of the wireless network. Performing all accounting operations on the wireless device itself minimizes the communication traffic required between the wireless service provider's host processor that handles billing operations and the wireless device or other network components, thus reducing network traffic and congestion and expanding the overall traffic handling capacity of the wireless network.

Once prepaid units of usage have been exhausted on a prepaid wireless device possessing internal accounting capabilities, a replenishment message must be sent to the user's wireless device in order to replenish the user's internal account with additional units of usage. This has traditionally required individualized replenishment messages to be generated and transmitted to each specific prepaid wireless device in order for a wireless service provider to replenish prepaid units of usage or to update the deduct rate or other account parameters. For example, if a wireless service provider needed to replenish account parameters or update account settings for a large number of wireless devices at the same time (e.g., 500,000 users), this would require 500,000 individual messages to be generated and transmitted to each of the 500,000 wireless devices. These large numbers of individualized messages provide a tremendous burden on the service provider to create the individual messages and also create severe congestion on the wireless network itself to deliver such a large number of individual messages.

SUMMARY

A system and method for the broadcast replenishment of the account parameters for select groups of wireless devices are provided. In one or more embodiments, the system and method include a provisioning server configured to receive a request for or to determine a need for a required change in internally stored account parameters within a select group of wireless devices associated with a prepaid amount of authorization for usage of such wireless devices. An encryption key associated with the select group of wireless devices is stored in a memory of the provisioning server or a database accessible by the provisioning server. The provisioning server retrieves the encryption key and generates an encrypted account update message using the retrieved encryption key and the account parameter(s) to be updated. The system is then configured to broadcast the encrypted account update message for receipt by the select group of wireless devices in order to update the internally stored account parameters within the group of wireless devices, such as to replenish their internally stored prepaid amount of authorization for usage. Only those wireless devices in the select group of wireless devices intended to receive the broadcast message are provided with the necessary key to decrypt the encrypted broadcast message, such that the broadcast encrypted account update message is only able to be received and decrypted by those wireless devices within the group of wireless devices previously provided with the key for decryption.

In one or more embodiments, the broadcast encrypted account update message provides the same prepaid amount of authorization for usage to be replenished to each wireless device in the select group of wireless devices. In one or more embodiments, the encrypted account update message is a Short Message Service (SMS) or Premium Short Message Service (PSMS) message, where appropriate additional components, such as a PSMS Generator, may be coupled to the provisioning server for the generation of PSMS message. The Short Message Service (SMS) message may be broadcast over a predetermined SMS cell broadcast channel subscribed to by the select group the wireless devices.

In one or more embodiments, the encrypted account update message may be generated to include an identifier such that each broadcast encrypted account update message is capable of being differentiated from other broadcast messages and acted upon separately by the select group of wireless devices.

In one or more embodiments, the select group of wireless devices may be configured to automatically replenish the internally stored prepaid amount of authorization for usage of the wireless devices on a periodic basis based on internally stored rules in the event that the broadcast encrypted account update message is not received by any of the wireless devices.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the description that follows, the various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Reference in this specification to "one embodiment", "an embodiment", "other embodiments", "one or more embodiments" or the like means that a particular feature, structure, or characteristic described in connection with the embodiment is included in at least one embodiment of the disclosure. The appearances of, for example, the phrases "in one embodiment" or "in one or more embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The word "exemplary" is used herein to mean "serving as an example, instance, or illustration." Any implementation described herein as "exemplary" is not necessarily to be construed as preferred or advantageous over other implementations.

As used herein, the term "wireless device" is intended to encompass any mobile technology computing device that connects to a wireless communication network and may or may not utilize a UICC/SIM card, such as mobile phones, cellular phones, smartphones or the like (e.g., Apple iPhone®, Google Android™, BlackBerry®, other type of PDA or smartphone), tablets (e.g., Tablet PC, iPad®, iPod Touch, etc.), wireless dongles, or other mobile computing devices. The term "wireless device" may be interchangeably used and referred to herein as "wireless handset," "handset," "mobile device," "device," or "phone." Further, reference herein to a "wireless network" or "network" is intended to encompass any type of wireless network from which a wireless carrier or mobile virtual network operator (MVNO) provides wireless services to a wireless device, such as but not limited to a cellular data network (e.g., Global System for Mobile Communication (GSM), CDMA, UMTS, EVDO, LTE or the like) or a wireless wide area network (e.g., WiFi, WiMax).

The word "broadcast" is used herein to mean the transmission of data (messages or information packets) so that it can be received by a plurality or large number of receiving wireless devices.

Figure 1:
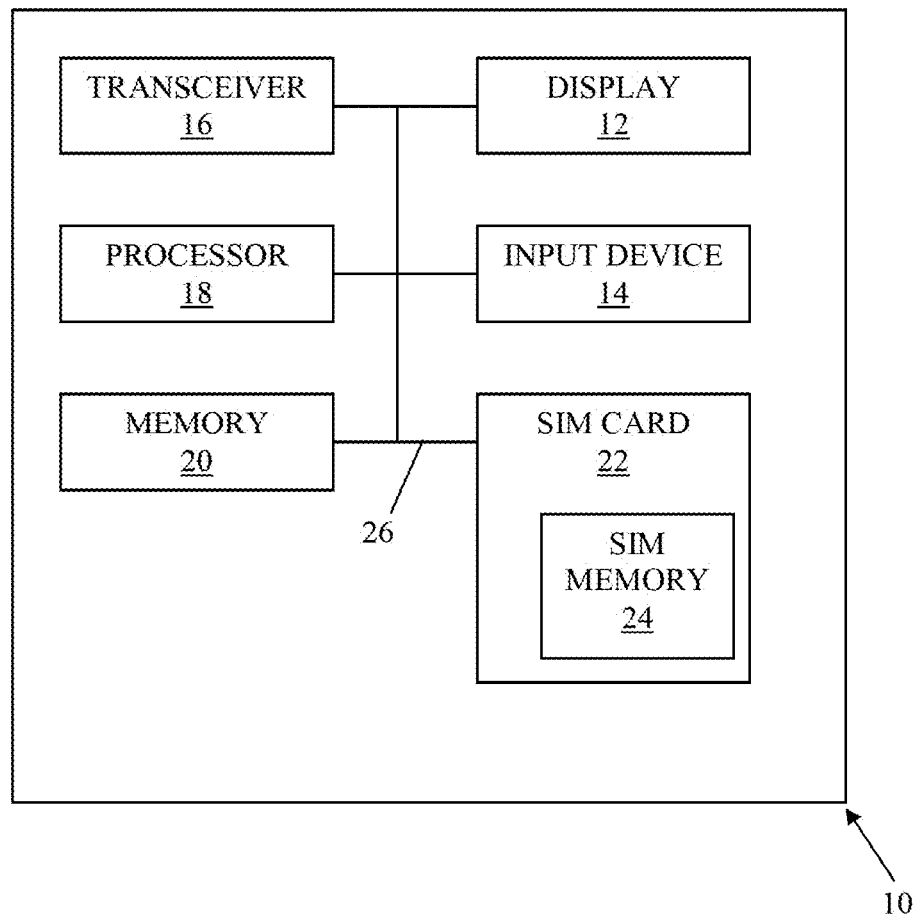
FIG. 1 is a schematic block diagram of a wireless device architecture in accordance with one or more embodiments of the present disclosure.
Figure 2:
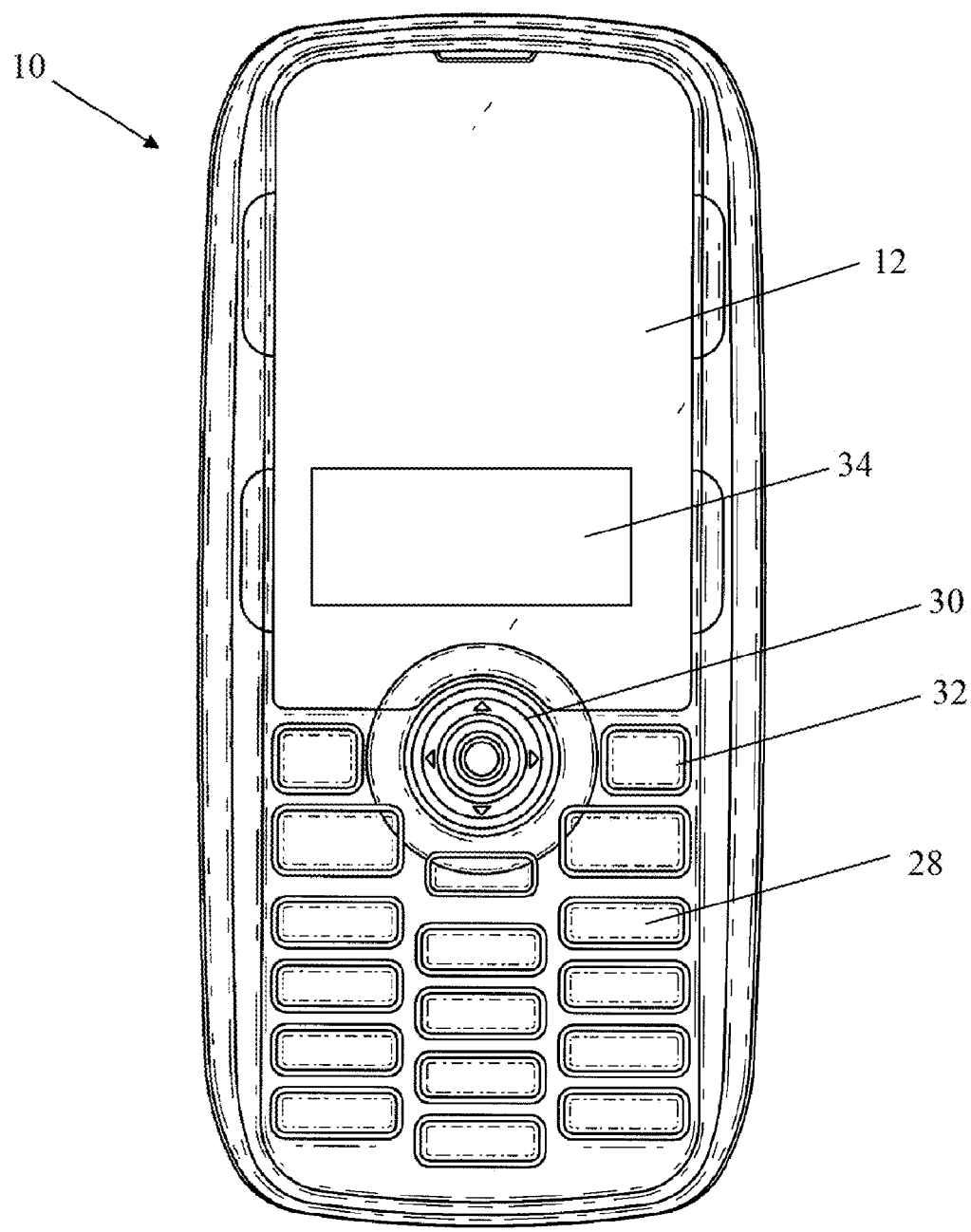
FIG. 2 illustrates an exemplary wireless device in accordance with one or more embodiments of the present disclosure.

FIG. 1 is a schematic block diagram of a wireless device 10 in accordance with one or more embodiments of the present disclosure. In one or more embodiments, the wireless device 10 may include a display 12, an input device 14, a transceiver 16, a processor 18, a memory 20 and a UICC/SIM card 22. In one or more embodiments, SIM card 22 may be removably received within a card slot (not shown) in wireless device 10 and may include its own internal SIM memory 24. Memory 20 may include, for example, random access memory ("RAM") or read only memory ("ROM"), while RAM may be volatile or non-volatile RAM. These various components within wireless device 10 are coupled to communicate data with one another, such as through an internal bus 26 or other connectors. In one exemplary embodiment, wireless device 10 may comprise a mobile phone, as illustrated in FIG. 2, in which display 12 may comprise a screen display and input device 14 may comprise any one or combination of a keypad 28, track ball 30, selectable buttons 32 and/or a touch screen 34 having selectable icons. The wireless device 10 includes an antenna coupled to transceiver 16 to facilitate the transmission and receipt of data, messages and communications by wireless device 10.

Although for the sake of clarity and simplicity, an exemplary embodiment of the present invention is described in terms of a prepaid wireless device 10 used in a prepaid mobile communications system, it should be understood that the present invention is not limited to this exemplary embodiment. Alternative embodiments of the present invention may include any mobile communications device with internally stored rules of operation that may be changed together with other mobile communications devices within a select group via a broadcast message received by the select group of mobile communications devices.

In one or more embodiments, software, processor-executable instructions and software architectures may be described in terms of certain software modules. For the purposes of this disclosure, a module is a software, hardware, or firmware (or combinations thereof) system, process or functionality, or component thereof, that performs or facilitates the processes, features, and/or functions described herein (with or without human interaction or augmentation). It should be understood that where a plurality of software modules are described, the functions performed by the plurality of software modules may alternatively be performed by a single software module. Similarly, where a single software module is described, the functions performed by the single software module may alternatively be performed by a plurality of software modules.

Wireless device 10 contains embedded software including modules, programs, processor-executable instructions and/or data stored internally in memory 20 (or SIM memory 24). In the exemplary embodiment for a prepaid wireless device 10 in which all accounting functionality is performed within the wireless device 10, internally stored account parameters, including a prepaid amount of authorization for usage of the wireless device 10, are also stored internally in memory 20 (or SIM memory 24). The prepaid amount of authorization for usage of wireless device 10 may include the number of airtime minutes, amount or volume of data transfer or other circuit switched or packet switched data transmission, number of messages (e.g., SMS or MMS messages or the like), communication rate, number of communications or any other type of communication or data transfer available for use by wireless device 10 that may be metered.

The embedded software instructs prepaid wireless device 10 how to handle incoming and outgoing communications (e.g., voice call, messages, data transfers, etc.), determines an appropriate deduct rate to apply against the communication, meters the communication, and applies the deduct rate against the metered communication to determine a value to be deducted from the stored prepaid amount of authorization for usage of wireless device 10. The stored prepaid amount of authorization is then updated in memory 20 (or SIM memory 24) of wireless device 10. For example, the embedded software inside the prepaid wireless device 10 deducts prepaid airtime units credit upon usage of wireless device 10. If the user's prepaid airtime units credit is exhausted, the prepaid wireless device 10 may lock itself, denying further use of wireless device 10 until additional prepaid airtime credits are provided to wireless device 10 (e.g., by the user purchasing additional prepaid airtime credits or the wireless provider otherwise providing additional prepaid airtime credits to the user). In one or more embodiments, all accounting operations associated with use of wireless device 10 are performed within wireless device 10, which assists in reducing network traffic and congestion and expanding the overall traffic handling capacity of the associated wireless network by minimizes the communication traffic required between the wireless service provider's host processor that handles billing operations and wireless device 10 or other network components.

Figure 3:
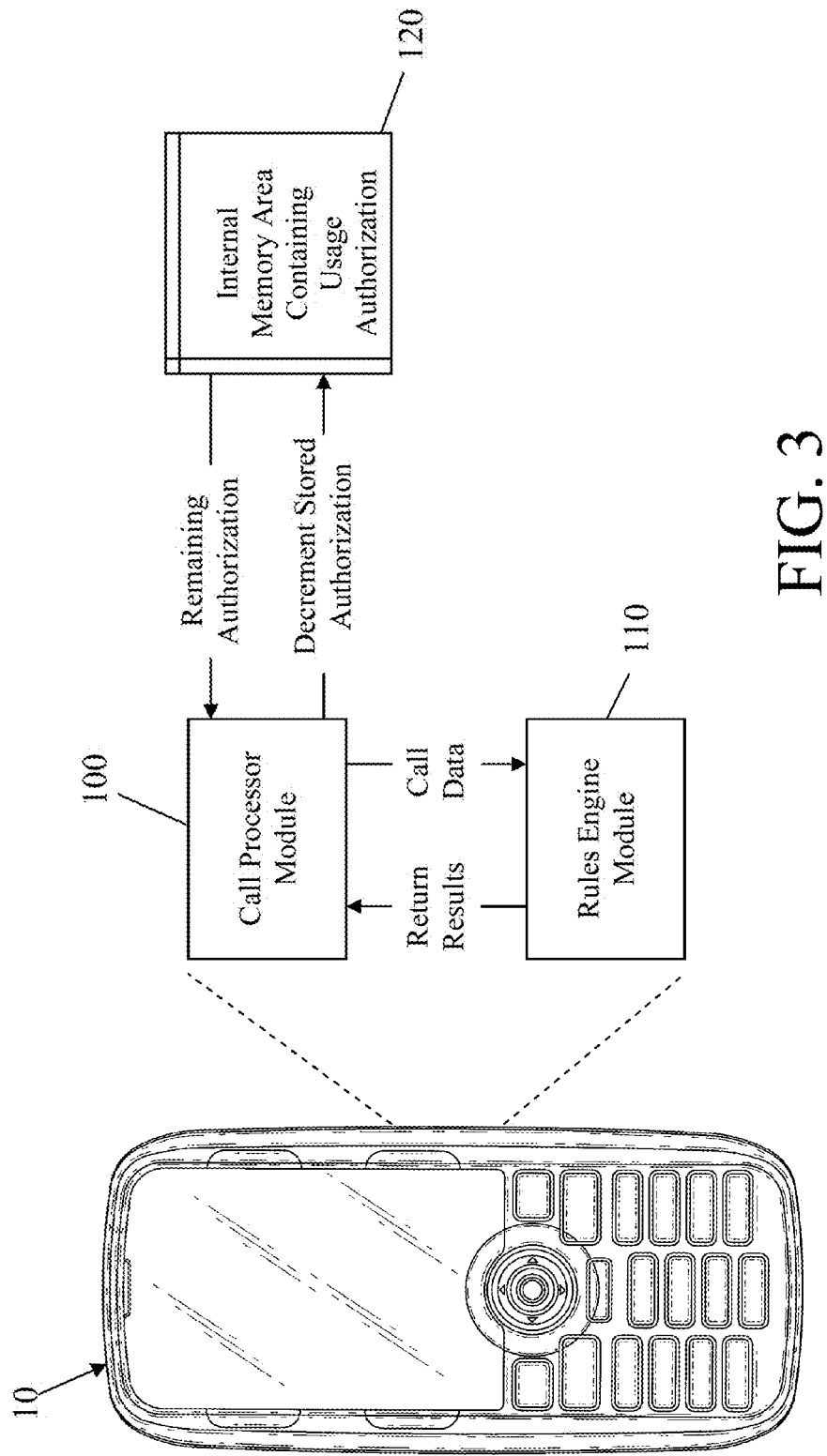
FIG. 3 is a schematic block diagram of a wireless device including certain programmed software modules in accordance with one or more embodiments of the present disclosure.

Referring now to FIG. 3, a block diagram depicting a software architecture embedded within wireless device 10 in accordance with an exemplary embodiment of the present disclosure is provided. A call processor module 100 detects a triggering event such as, for example, an inbound or outbound call. The call processor module 100 obtains certain data about the call such as, for example, the telephone number associated with the call. The call processor module 100 then calls a rules engine module 110 to determine the appropriate deduct rate to apply against the stored amount of usage authorization 120 (e.g., available airtime units credit). The deduct rate is the time rate at which air time units credit or other amount of authorization for usage of wireless device 10 is deducted associated with the communication.

Rules engine module 110 applies rules stored in internal memory 20 (or SIM memory 24) to the communication information or call data received by the call processor module 100. Based on the communication information or call data, the rules engine module 110 determines the appropriate deduct rate to apply against the communication. Rules engine module 110 returns the resulting information to the call processor module 100. Based on these results, the call processor module 100 either allows or prohibits the communication, and if the communication is allowed, applies the correct deduct rate and deducts from the stored amount of usage authorization 120 until the communication is ended or the stored amount of usage authorization 120 is exhausted. One manner of programming a wireless device 10 to possess such internal accounting functionality is described in U.S. Pat. No. 7,444,141, issued on Oct. 28, 2008 and entitled, "Method and System for Programming Control of Mobile Communication Units," the contents of which are incorporated by reference herein in its entirety.

Figure 4:
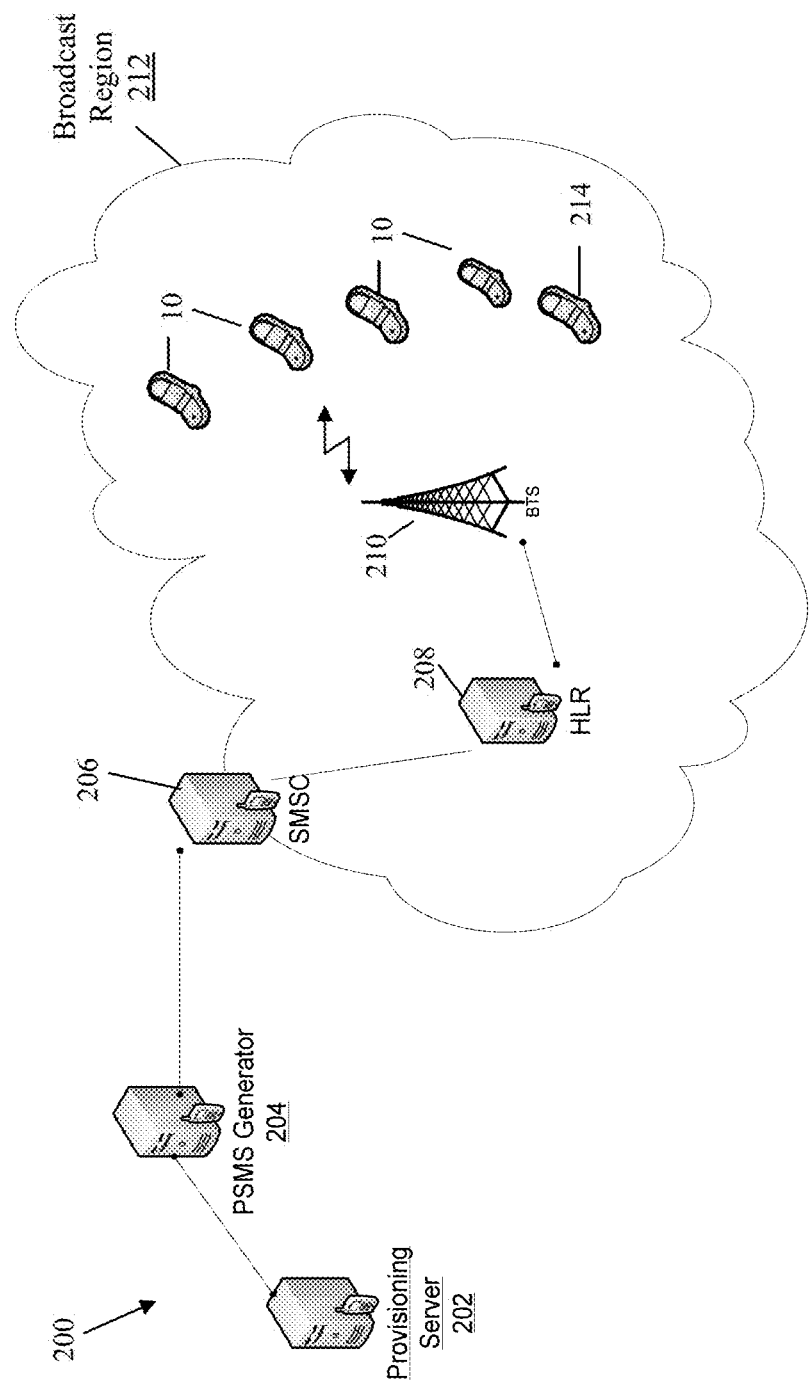
FIG. 4 is a schematic block diagram of a system and wireless devices for replenishing internally stored account parameters on a select group of wireless devices, in accordance with one or more embodiments of the present disclosure.

Referring now to FIG. 4, a block schematic illustration is provided in accordance with one or more embodiments of a system 200 for replenishing internally stored account parameters on a select group of wireless devices 10. The system 200 includes a provisioning server 202, which may be operated by a wireless network operator or a mobile virtual network operator (MVNO), capable of provisioning or updating certain services and/or parameters of use for select groups of wireless devices 10. In one or more embodiments, when there is a need, desire or received indication to change the internally stored account parameters within the select group of wireless devices 10 (e.g., a prepaid amount of authorization for usage), provisioning server 202 prepares an account update message containing information and/or instructions for modifying, changing or otherwise updating the internally stored account parameters within the select group of wireless devices 10. In one or more embodiments, a Short Message Service (SMS) or Premium Short Message Service (PSMS) generator 204 is coupled to the provisioning server 202 for generating an encrypted account update message in the form of an encrypted SMS message based on the account update message prepared by the provisioning server 202. While the encrypted account update message will be described herein as an encrypted SMS message, it is understood that other types of encrypted messages known to those skilled in the art could be utilized that may be broadcast for receipt solely by an intended group of select wireless devices 10.

In one or more embodiments, PSMS generator 204 may be formed as part of the same single provisioning server 202 or these components may be part of a server farm or server network, which is a logical group of one or more servers, either located locally or remotely from one another. By way of example, there could be multiple servers that may be associated or connected with each other, or multiple servers could operate independently, but with shared data. In a further embodiment and as is typical in large-scale systems, application software could be implemented in components, with different components running on different server computers, on the same server, or some combination.

The encrypted account update SMS message is provided to a Short Message Service Center (SMSC) 206 in communication with the PSMS generator 204 for delivery of the encrypted SMS message to the select group of wireless devices 10. The SMSC 206 is responsible for handling the SMS operations of the wireless network, where the SMSC 206 queues and routes SMS messages for delivery to wireless devices 10. The SMSC 206 provides the encrypted SMS message to one or more Home Location Registers (HLRs) 208 and base transceiver stations (BTS) 210 (or cell sites) for the encrypted SMS message to be broadcast throughout a broadcast region 212. In one ore more embodiments, the encrypted SMS message is broadcast on a predetermined SMS cell broadcast channel. An wireless devices 10 within the broadcast region 212 within the select group of select wireless devices 10 intended to receive the broadcast encrypted SMS message will be able to receive, recognize, and decrypt the encrypted SMS message. The information and/or instructions contained within the encrypted SMS message will then be applied by each of the wireless devices 10 receiving the encrypted SMS message in order to modifying, change or otherwise update the internally stored account parameters within the wireless devices 10. For example, the information and/or instructions contained within the encrypted SMS message may cause the rules engine module 110 or stored amount of usage authorization 120 described above to be updated.

Those wireless devices 214 within the broadcast region 212 that are not within the select group of wireless devices 10 intended to receive the broadcast encrypted SMS message will simply ignore or not be able to decrypt the broadcast encrypted SMS message. Thus, the broadcast encrypted SMS message will be benign and not processed by all wireless devices 214 not within the select group of wireless devices 10 intended to receive the broadcast encrypted SMS message. In one or more embodiments, the select group of wireless devices 10 are initially programmed with or previously provided with a key that allows such wireless devices 10 to decrypt the broadcast encrypted SMS message. For example, the select group of wireless devices 10 may be preprogrammed with the required key for decryption prior to their distribution to users or may alternatively have the key programmed into the wireless devices 10 at a later time, such as during activation of the wireless devices 10 or through over-the-air (OTA) or direct physical connection updates to wireless devices 10.

In one or more embodiments, the system of FIG. 4 and otherwise described herein can be utilized to replenish stored parameters within each of the wireless devices 10 in the selected group in connection with a prepaid amount of authorization of usage allocated to the wireless devices 10. For example, each of the wireless devices 10 in the selected group may be provided with the same prepaid metered usage parameter (e.g., same number of prepaid airtime minutes, amount or volume of data transfer or other circuit switched or packet switched data transmission, number of messages or other metered parameter), where this prepaid metered usage parameter may be replenished on a periodic or other basis. In order to update this same prepaid metered usage parameter in each of the wireless devices 10 in the selected group, a single encrypted SMS message can be broadcast within the broadcast region 212 for receipt by each of the wireless devices 10, such that each of the wireless devices 10 in the selected group can updated its internally stored parameters to correspond to the same prepaid metered usage parameter requested to be updated in the encrypted SMS message.

In one or more embodiments, each of the wireless devices 10 in the selected group of wireless devices 10 may be part of a subscription plan that provides an identical prepaid amount of authorization of usage allocated each of the wireless devices 10, where this prepaid amount of authorization of usage may be automatically replenished on a periodic basis. In one or more embodiments, each of the wireless devices 10 in the selected group may be allocated the same predetermined amount of metered prepaid usage periodically (e.g., each month the wireless devices 10 may be provided the same number of prepaid airtime minutes, amount or volume of data transfer or number of SMS messages, etc.). As part of the subscription plan, the predetermined amount of metered prepaid usage may be replenished within the wireless devices 10 on a periodic basis by the internally programming of the wireless devices 10. For example, as part of the prepaid subscription plan, the wireless devices 10 may be programmed to automatically replenish the number of prepaid airtime minutes (or other account parameters) available for usage on the first of each month. If the provider of the prepaid subscription plan wants to change any of the usage parameters or replenishment parameters (e.g., changing the deduct rate or number of prepaid airtime minutes or other usage parameters to be replenished), the provider of the prepaid subscription plan can arrange for a single encrypted SMS message to be broadcast for receipt by each of the wireless devices 10 in the selected group of wireless devices 10 in order to update all of their internally stored replenishment parameters using only a single broadcast SMS message.

In this manner, the embodiments of the present disclosure provide an efficient mechanism for replenishing internally stored account parameters on groups of wireless devices (e.g., replenishing usage parameters) that require identical updates in a manner that significantly reduces network traffic while reducing overhead costs to wireless network operators and plan providers by minimizing the number of account update messages that need to be generated and delivered.

In one or more embodiments, the present systems and methods described herein can be utilized to provide wireless devices 10 with identical prepaid internally stored account parameters to a select group of users, such as but not limited to groups of employees of a company, members of a family, and/or groups of recipients of free mobile phone services from public, private or governmental agencies.

In one exemplary embodiment, prepaid wireless devices 10 and wireless services may comprise wireless devices having prepaid accounts provided by public, private or governmental agencies (e.g., Lifeline or other U.S., state or local government supported programs for low income individuals that are provided free mobile phone services prepaid by the government or private entities). Mobile phones are increasingly replacing conventional land line phones, such that many states are now or will be offering Lifeline or other government supported programs for low income individuals in the form of mobile phone services in place of land line phone services. For example, the assignee of the present application offers a program entitled Safelink® in which it provides low-income individuals with a free mobile phone and free monthly air time minutes in cooperation with certain states that subsidize these services to their low-income residents. Safelink® customers are allocated free monthly air time minutes every month, where such air time minutes are replenished on a monthly basis. In the past, in order to change or update the prepaid internally stored account parameters within the Safelink® group of wireless devices 10 (e.g., a state agency that wanted to change the number of free monthly air time minutes to be replenished on the wireless devices 10 of Safelink® subscribers), it was necessary for the wireless services provider to construct and transmit a unique PSMS message per wireless device/subscriber in order to change any provisioning parameters stored on the wireless device. By way of example, if each state were to provide 500,000 of its low-income residents with wireless devices 10 having prepaid airtime minutes that replenish monthly and if an average of as few as 3 of the states every month perform recalculations of the airtime minutes to be replenished (or other stored metered parameters), then 1.5 million PSMS messages would need to be uniquely generated and transmitted to the corresponding 1.5 million wireless devices 10 (3 states×500,000 wireless devices in each state) to update the replenishment parameters. The number of unique PSMS messages that could be required each month could even reach as high as 25 million PSMS messages or more if all of the states decided to perform recalculations of the air time minutes to be replenished in any given month. These volumes of PSMS messages would create a massive burden and expense on backend infrastructure costs and resources to the wireless services provider in addition to overloading the bandwidth and resources of the wireless network and SMSC's.

In contrast, the systems and methods of the various embodiments described herein can be utilized to provide updates/modifications to the internally stored account parameters of select groups of wireless devices 10 that require identical updates by using a single broadcast message, thereby significantly reducing network traffic and overhead costs to wireless network operators and plan providers.

Figure 5:
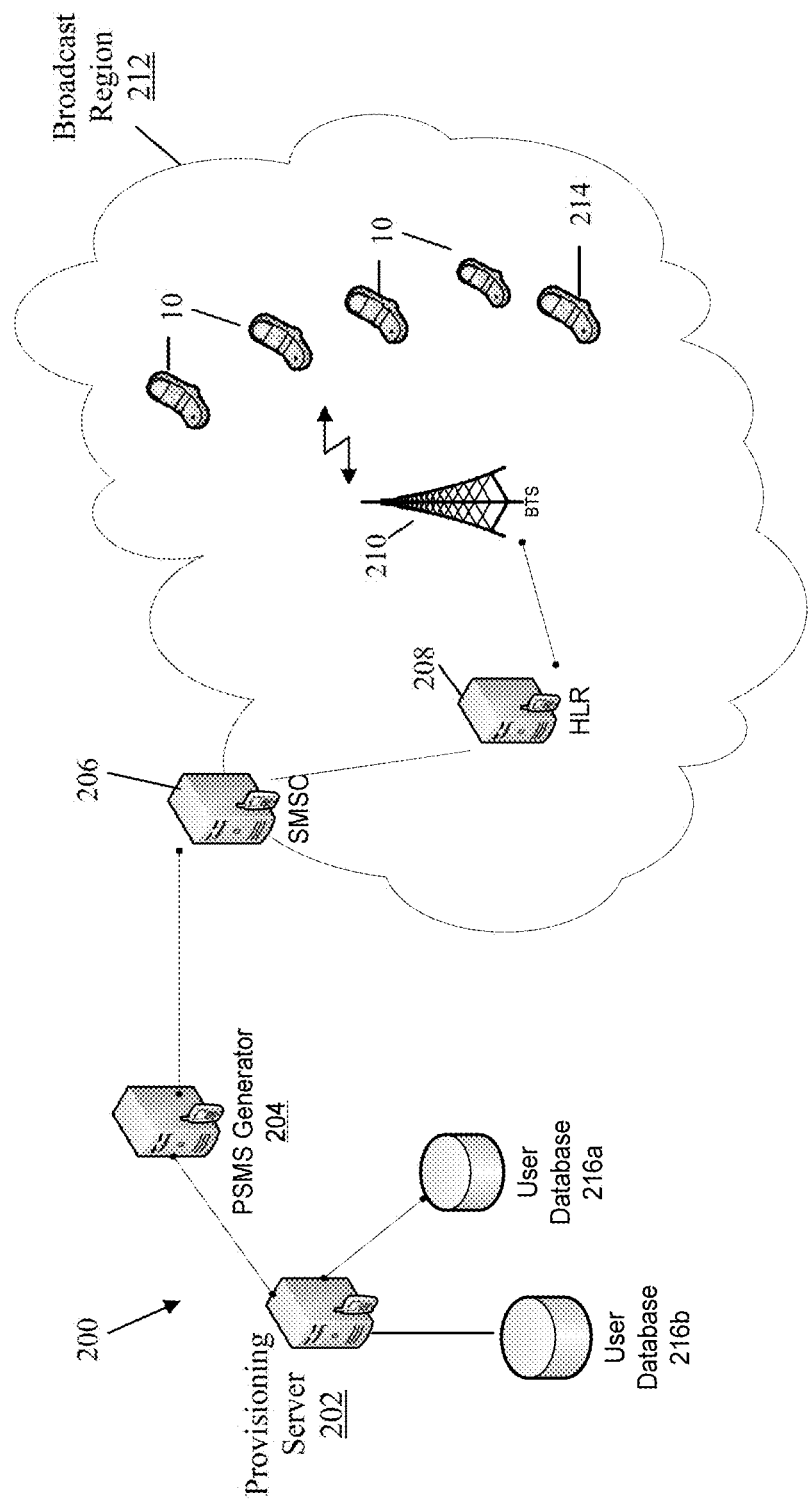
FIG. 5 is a schematic block diagram of a system and wireless devices for replenishing internally stored account parameters on a select group of wireless devices, in accordance with one or more embodiments of the present disclosure.

In one or more exemplary embodiments in which prepaid wireless devices 10 are provided to groups of users (e.g., the Safelink® program described above or prepaid wireless devices 10 provided to groups of employees by companies, etc.), each group of wireless devices 10 that is intended to have internally stored account parameters (e.g., prepaid amount of authorization of usage to be replenished) changed or modified together as a group can be assigned its own respective encryption key. Referring now to FIG. 5, in one or more embodiments, each group of wireless devices 10 may have its corresponding encryption key and other information regarding the group of wireless devices 10 and their users stored in corresponding user databases 216a, 216b, etc. For example, user database 216a may contain a stored corresponding encryption key and other information regarding a first group of wireless devices 10 while user database 216b may contain a stored corresponding encryption key and other information regarding a second corresponding group of wireless devices 10 and so. Any number of user databases 216a, 216b, . . . 216n may be provided for up to n number of different respective groups of wireless devices 10, where each respective select group of wireless devices 10 may have its internally stored account parameters changed or modified in unison as a group separately from the other groups of wireless devices 10. Alternatively, it is understood that the corresponding encryption keys and other information regarding multiple groups of wireless devices 10 may be stored in a single user database 216. It is also understood that any or all of the user databases 216a, 216b, etc. may be stored locally or remotely from provisioning server 202 and may be maintained by the operator of the provisioning server 202 (e.g., the wireless services provider or MVNO) or by a separate entity related to the users in the group of the wireless devices 10 (e.g., each company or state may maintain its own user database 216 that is accessed by provisioning server 202 to retrieve the required encryption key and other information related to a select group of wireless devices 10).

Figure 6:
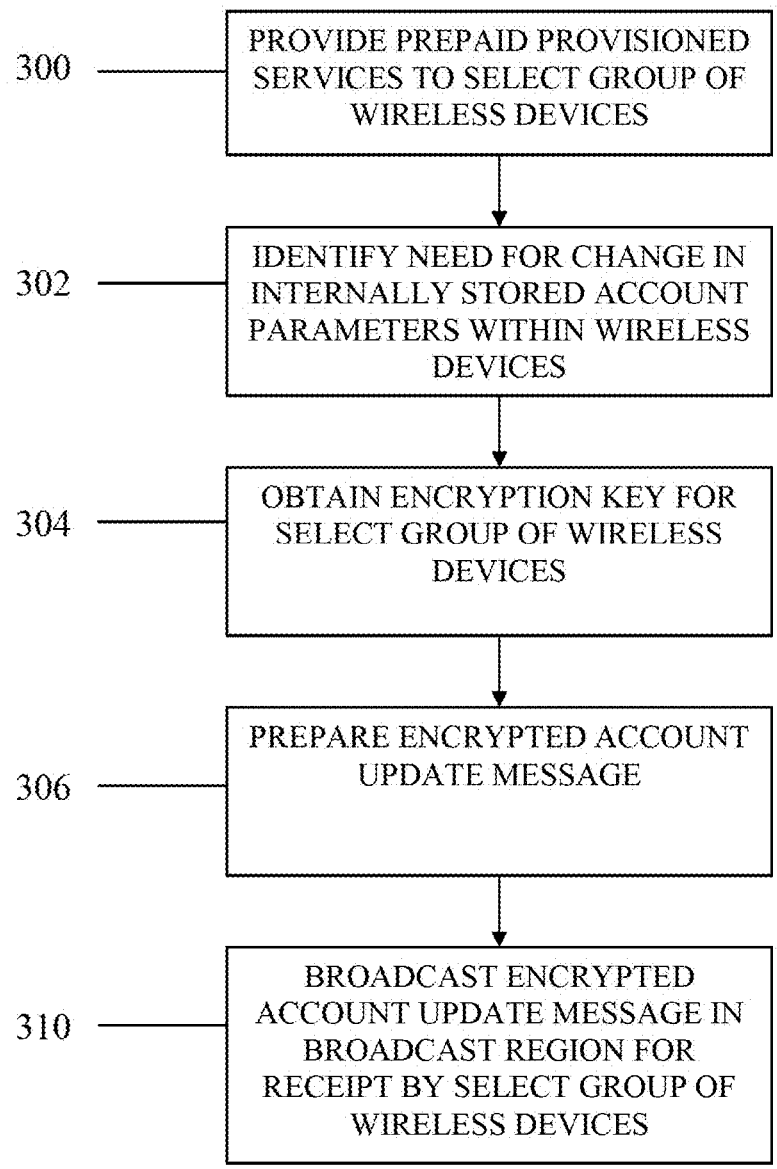
FIG. 6 is an operation flow diagram illustrating a method of generating a broadcast message for replenishing internally stored account parameters on a select group of wireless devices in accordance with one or more embodiments of the present disclosure.

Referring now to FIG. 6, an operational flow diagram is provided illustrating a method for replenishing internally stored account parameters on a select group of wireless devices in accordance with one or more embodiments of the present disclosure. In one or more embodiments, the operational flow of FIG. 6 is an algorithm or one or more software modules executable by provisioning server 202 and/or other components of the system of FIG. 5 or other figures. Initially in operation 300, a plurality of wireless devices 10 are provided to a select group of users, where each wireless device 10 is programmed/provisioned with internally stored account parameters associated with a prepaid amount of authorization for usage of the wireless device 10 and to internally meter usage of the wireless 10 and deduct the metered usage from the internally stored account parameters, such as described in connection with the FIG. 3.

In operation 302, an indication or a need for a required change in the internally stored account parameters within the select group of wireless devices 10 is determined and/or received by provisioning server 202, such as determining a need to change parameters associated with the prepaid amount of authorization for usage in the select group of wireless devices 10. In one or more embodiments, this need for a required change in the internally stored account parameters may be determined by inputting new parameters into provisioning server 202 or one of the user databases 216 or by otherwise receiving a notification delivered to provisioning server 202. Further, by way of example, the parameters to be changed may relate to the deduct rate stored in the rules engine module 110, rules for replenishing an internally stored amount of usage authorization in the rules engine module, an update to the stored amount of usage authorization 120, or other internally stored parameters.

Once a need for a required change in the internally stored account parameters within the select group of wireless devices 10 is determined, an encryption key associated with the select group of wireless devices 10 is obtained in operation 304, such as by retrieving the corresponding encryption key from one of the user databases 216a, 216b associated with the select group of wireless devices 10. An encrypted account update message is then generated in operation 306 using the encryption key, wherein the contents of the encrypted account update message include instructions and/or information related to the internally stored account parameter(s) to be updated or changed in the select group of wireless devices 10. In one or more embodiments, the encrypted account update message is an encrypted Short Message Service (SMS) message.

In one or more embodiments, the encrypted account update message also includes an identification such that each encrypted account update message that is broadcast is capable of being separately identified and acted upon by the wireless devices 10 from other broadcast messages. For example, the SMS cell broadcast system provides for sequence numbers that could be added to each SMS message to allow the wireless devices 10 to track the sequence numbers and ignore previously acted on requests.

The encrypted account update message is then broadcast within at least one broadcast region 212 in operation 310 for delivery to and receipt by the select group of wireless devices 10. For example, in the case of an encrypted Short Message Service (SMS) message, network components known to those skilled in the art for delivering SMS messages to wireless devices 10 (e.g., SMSC 206, HLR 208 and BTS 210) may be utilized in accordance with their known functionality. The encrypted SMS message may be broadcast over a predetermined SMS cell broadcast channel subscribed to by the group the wireless devices 10. Only those wireless devices 10 in the broadcast region 212 in the select group of wireless devices 10 will possess the required key to decrypt the encrypted account update message. Upon receipt of the encrypted account update message by the select group of wireless devices 10, the content within the encrypted account update message will be utilized by each of the wireless devices 10 to update the internally stored account parameters accordingly. For example, when the account parameters to be updated relate to the replenishment of an internally stored prepaid amount of authorization for usage, each of the wireless devices 10 in the select group are provided with instructions to replenish their internally stored prepaid amount of authorization for usage according to the updated account parameters. In one or more embodiments, the broadcast encrypted account update message provides the same prepaid amount of authorization for usage to be replenished on each wireless device 10 (or rules for replenishment) in the group of wireless devices 10.

In one or more embodiments, in order to provide for redundancy in case a particular wireless device 10 is turned off or out of the broadcast region 212 when the encrypted account update message is broadcast, the systems and methods of the present disclosure may be further configured to broadcast the encrypted account update message at predetermined times when there is a high probability that the wireless devices 10 will be turned on and/or in the broadcast region 212. In other embodiments, for added redundancy in case there are other transmission or delivery problems or in case a particular wireless device 10 is turned off or out of the broadcast region 212 during the original broadcast, the encrypted account update message may be rebroadcast. Furthermore, in one or more embodiments, in case the encrypted account update message is not received or any reason, the wireless devices 10 may be programmed with default settings that allow continued use of the wireless devices (e.g., automatic prepaid replenishment settings).

The broadcast encrypted account update message is capable of modifying, changing or updating a variety of different stored internal account parameters in the select group of wireless devices 10. In one or more embodiments, the broadcast encrypted account update message may provide a one-time addition or replenishment of internally stored account parameters (e.g., a prepaid amount of authorization for usage of the wireless network) on the select group of wireless devices. In one or more embodiments, the broadcast encrypted account update message may provide an update or modification to internally stored rules within the wireless devices 10 for the periodic replenishment of internally stored account parameters (e.g., replenishment of a certain prepaid amount of authorization for usage of the wireless network on a monthly basis). In one or more embodiments, the broadcast encrypted account update message may modify or update other internally stored account parameters, such as parameters associated with metered usage of the wireless network (e.g., modification of the deduct rate, etc.).

Figure 7:
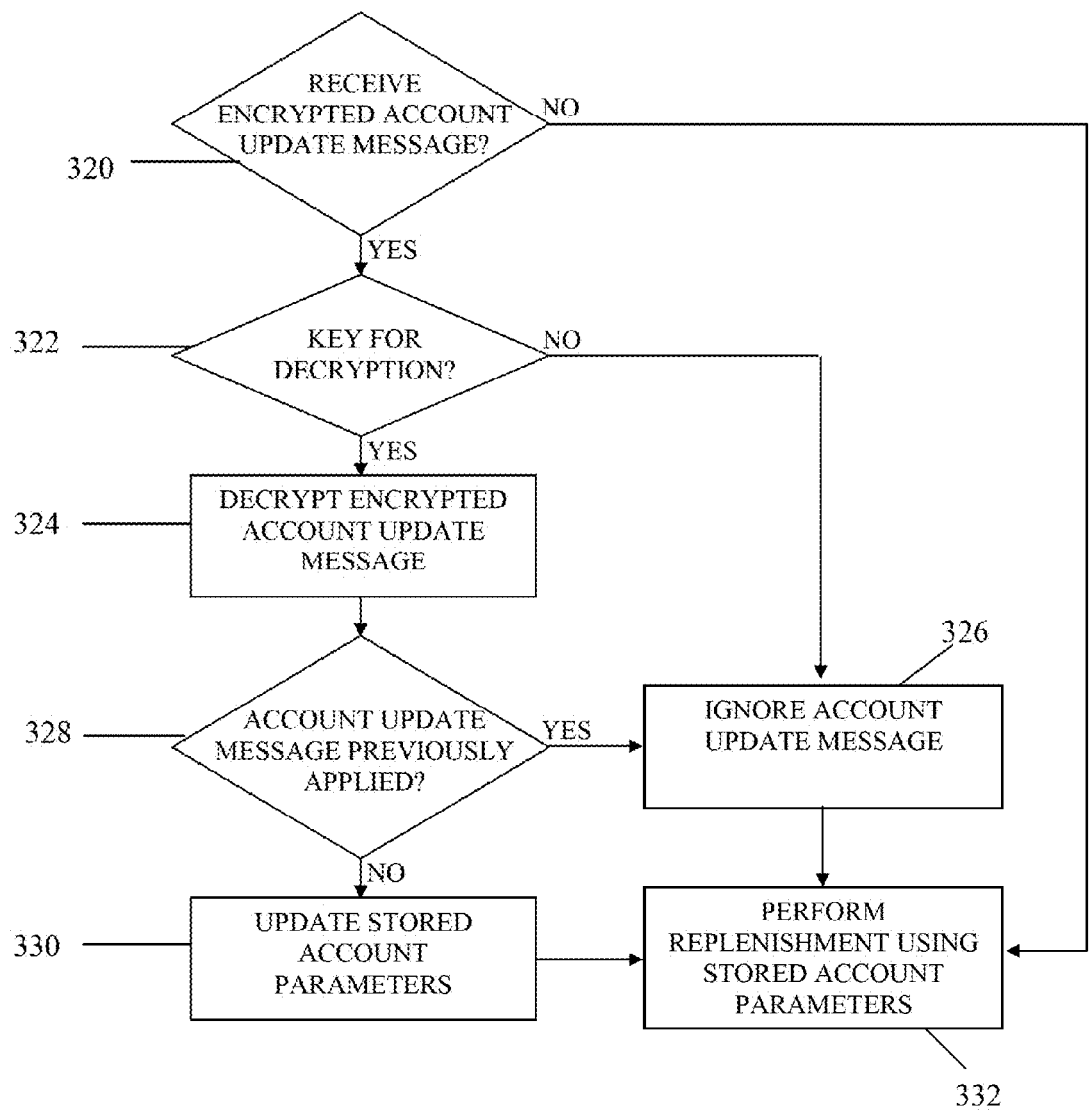
FIG. 7 is an operation flow diagram illustrating a method executable on a wireless device for replenishing internally stored account parameters on a select group of wireless devices in accordance with one or more embodiments of the present disclosure.

Referring now to FIG. 7, an operational flow diagram is provided illustrating a method executed on a wireless device 10 for replenishing internally stored account parameters in accordance with one or more embodiments of the present disclosure. For example, this method may be executed by the call processor module 100, rules engine module 110 or another software module stored internally in the memory 20 or SIM memory 24 of wireless device 10. In operation 320, it is determined whether a broadcast encrypted account update message has been received by wireless device (e.g., over a predetermined SMS cell broadcast channel). If no broadcast encrypted account update message is received or otherwise is not applied by the wireless device 10, wireless device 10 may be programmed to automatically perform replenishment procedures according to stored account parameters in operation 332. For example, internal stored account parameters may provide instructions for wireless device 10 to automatically replenish the prepaid amount of authorization for usage of the wireless device 10 on a periodic basis (e.g., wireless device 10 may be programmed to automatically add or replenish 60 prepaid air time minutes to the internal memory area 20 on the first of every month).

If the broadcast encrypted account update message is received, it is determined in operation 322 whether wireless device 10 contains an appropriate key for decrypting the encrypted account update message. Alternatively, it is otherwise determined in operation whether the broadcast encrypted account update message is intended for this particular wireless device 10. If either wireless device 10 does not possess an appropriate key to decrypt the broadcast encrypted account update message or if the message is not intended for this particular wireless device 10, then the encrypted account update message is ignored by the wireless device 10 in operation 326 and replenishment is performed in operation 332 according to previously stored account parameters. If the broadcast encrypted account update message is intended for this particular wireless device 10 and an appropriate key for decryption is stored within wireless device (e.g., within memory 20 or SIM memory 24), then the encrypted account update message is decrypted in operation 324.

After decryption, it is then determined in operation 328 whether the broadcast account update message has previously been received and applied by the wireless device 10. For example, in the situation where the broadcast account update message includes a sequence number identifier, wireless device 10 can determine whether a message with a particular identifier has previously been applied. If the broadcast account update message has previously been applied, the account update message is ignored by the wireless device 10 in operation 326 and replenishment is performed in operation 332 using the already stored account parameters. If the broadcast account update message had not been previously applied, the account parameters stored within wireless device 10 are then updated or modified in operation 330 according to the instructions and/or information contained within the broadcast account update message. After the stored account parameters have been updated or modified, replenishment is then performed in operation 332 using the stored account parameters that have been updated or modified in operation 330.

In one or more embodiments, in the event that a wireless device 10 is turned off during the broadcast, outside of the broadcast region 212 or otherwise does not receive the broadcast account update message, wireless device 10 will revert back to the previously programmed and stored account parameters to perform replenishment without the updated settings. This continuation of previously stored replenishment procedures prevents the wireless device 10 from becoming rendered disabled or unusable in the event that a broadcast account update message is not received.

In one or more embodiments, the methods and algorithms described in various embodiments herein may be implemented in software, stored on a computer readable medium or computer readable storage medium, such as a memory of provisioning server 202 and/or PSMS generator 204 and/or other system components, where the memory (or memories of these components) may store computer readable instructions, e.g., program code, that can be executed by a processor or controller to carry out one or more of the techniques described herein.

Figure 8:
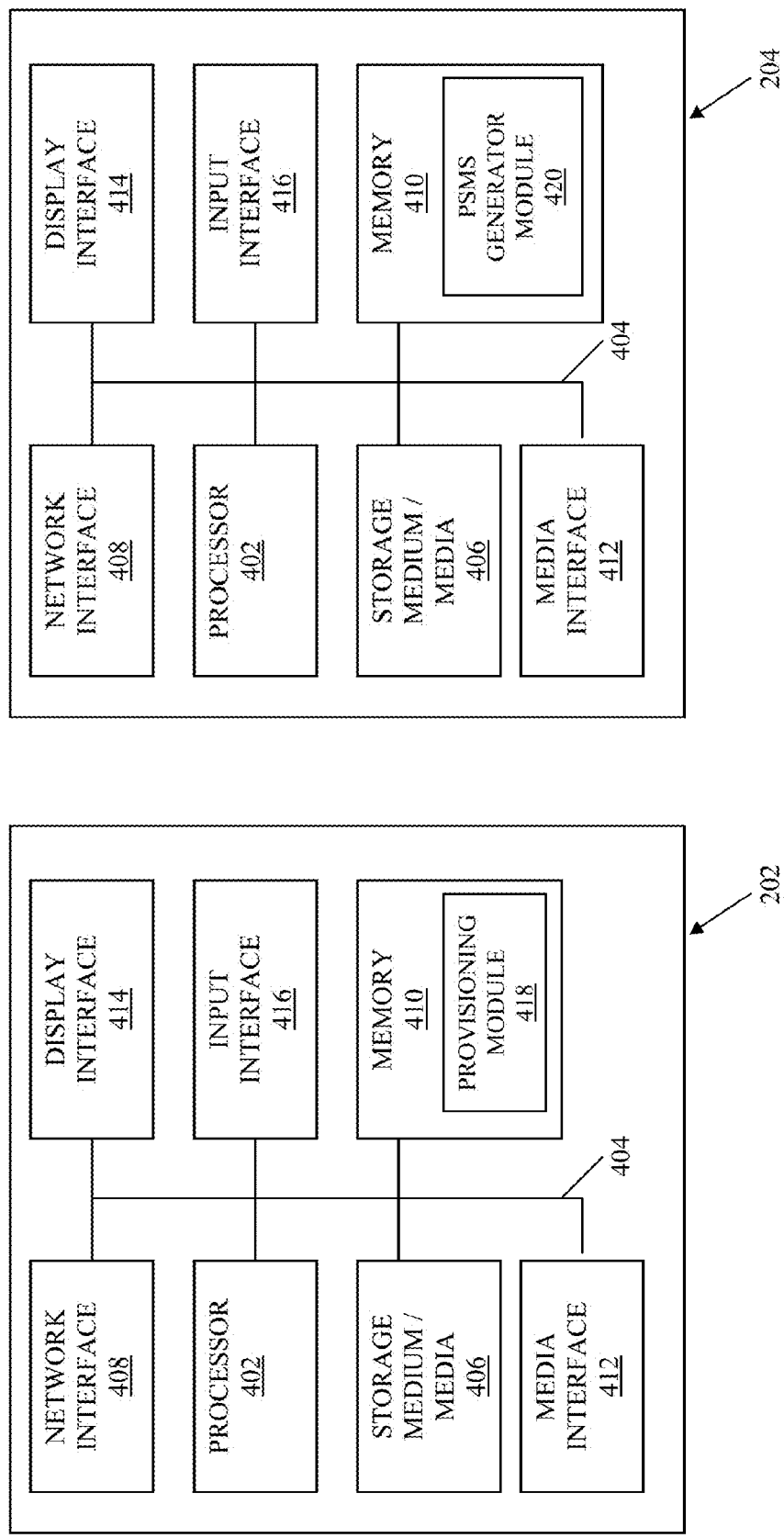
FIG. 8 is a schematic block diagram of provisioning server and PSMS generator architectures in accordance with one or more embodiments of the present disclosure.

FIG. 8 is a block diagram illustrating internal architectures of an example computing devices for provisioning server 202 and PSMS generator 204, in accordance with one or more embodiments of the present disclosure. Provisioning server 202 and PSMS generator 204 are referred to herein refers to any computer or device with a processor capable of executing logic or coded instructions, and could be a server, personal computer, set top box, smart phone, pad computer or media device, to name a few such devices. As shown in the example of FIG. 8, the internal architecture of provisioning server 202 and PSMS generator 204 include one or more processors 402 (or CPUs), which interface with at least one computer bus 404. Also interfacing with computer bus 404 are persistent storage medium/media 406, network interface 408, memory 410, e.g., random access memory (RAM), run-time transient memory, read only memory (ROM), etc., media disk drive interface 412 as an interface for a drive that can read and/or write to media including removable media such as floppy, CD ROM, DVD, etc. media, display interface 414 as interface for a monitor or other display device, at least one input interface 416 (e.g., keyboard interface, mouse or other pointing device interface, etc.), and miscellaneous other interfaces not shown individually, such as parallel and serial port interfaces, a universal serial bus (USB) interface, and the like.

Memory 410 interfaces with computer bus 404 so as to provide information stored in memory 410 to processor 402 during execution of software programs such as an operating system, application programs, device drivers, and software modules that comprise program code, processor-executable instructions and/or computer executable process steps, incorporating functionality described herein, e.g., one or more of process flows described herein. For example, the operations and process flows performed by provisioning server 202 may be embodied in a provisioning module 418 stored in memory 410 of provisioning server 202 and the operations and process flows performed by PSMS generator 204 may be embodied in a PSMS generator module 420 stored in memory 410 of PSMS generator 204. It is understood that provisioning module 418 and PSMS generator module 420 may both be stored in the memory of the same device (e.g., provisioning server 202) when the operations of both provisioning server 202 and PSMS generator 204 are embodied in a single device. Processor 402 loads processor-executable process steps from storage, e.g., memory 410, storage medium/media 406, removable media drive, and/or other storage device. Processor 402 can then execute the stored process steps in order to execute the loaded processor-executable process steps. Stored data, e.g., data stored by a storage device, can be accessed by processor 402 during the execution of processor-executable process steps. Persistent storage medium/media 406 is a computer readable storage medium(s) that can be used to store software and data, e.g., an operating system and one or more application programs, device drivers, and/or program modules and data files used to implement one or more embodiments of the present disclosure.

For the purposes of this disclosure, a computer readable medium stores computer data, which data can include computer program code that is executable by a processor of the wireless device 10, provisioning server 202, PSMS generator 204 or other computing device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more embodiments, the actions and/or events of a method, algorithm or module may reside as one or any combination or set of codes and/or instructions on a computer readable medium or machine readable medium, which may be incorporated into a computer program product.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which may be accorded the broadest interpretation so as to encompass all such modifications and similar structures. The present disclosure includes any and all embodiments of the following claims.

The invention claimed is:

1. A method for replenishing internally stored account parameters on a select group of wireless devices, the method comprising:
   providing a group of wireless devices, each wireless device having internally stored account parameters associated with a prepaid amount of authorization for wireless usage of the wireless device;
   obtaining an encryption key uniquely associated with the group of wireless devices;
   generating an encrypted account update message using the encryption key and at least one account parameter to be changed that includes a prepaid amount of authorization for wireless usage of the wireless device; and
   broadcasting the encrypted account update message for receipt by the group of wireless devices in order to update the internally stored account parameters within the group of wireless devices to replenish their internally stored prepaid amount of authorization for wireless usage of the wireless device, wherein the broadcast encrypted account update message is only able to be decrypted by those wireless devices within the group of wireless devices.

2. The method of claim 1, wherein each of the wireless devices are configured to automatically replenish the internally stored prepaid amount of authorization for usage of the wireless device on a periodic basis based on internally stored rules regardless of whether the broadcast encrypted account update message is received by any of the wireless devices.

3. The method of claim 1, wherein the broadcast encrypted account update message provides the same prepaid amount of authorization for usage of the wireless device to be replenished on each wireless device in the group of wireless devices.

4. The method of claim 1, wherein the encrypted account update message is a Short Message Service (SMS) message.

5. The method of claim 1, further comprising broadcasting the Short Message Service (SMS) message over a predetermined SMS cell broadcast channel subscribed to by the group the wireless devices.

6. The method of claim 1, further comprising providing the group of wireless devices with a decryption key capable of decrypting the broadcast encrypted account update message.

7. The method of claim 1, further comprising including an identification within the encrypted account update message such that each broadcast encrypted account update message is capable of being separately identified and acted upon by the wireless devices.

8. A system for replenishing internally stored account parameters on a select group of wireless devices, comprising:
- a database configured to obtain an encryption key uniquely associated with the group of wireless devices;
- a server configured to generate an encrypted account update message using the encryption key and at least one account parameter to be changed that includes an amount of authorization for wireless usage of the wireless device; and
- a broadcast system configured to broadcast the encrypted account update message for receipt by the group of wireless devices in order to update the internally stored account parameters within the group of wireless devices to replenish their internally stored prepaid amount of authorization for wireless usage of the wireless device, wherein the broadcast encrypted account update message is only able to be decrypted by those wireless devices within the group of wireless devices.

9. The system of claim 8, further comprising means for automatically replenishing the internally stored prepaid amount of authorization for usage of the wireless devices on a periodic basis based on internally stored rules regardless of whether the broadcast encrypted account update message is received by any of the wireless devices.

10. The system of claim 8, wherein the broadcast encrypted account update message provides the same prepaid amount of authorization for usage of the wireless device to be replenished on each wireless device in the group of wireless devices.

11. The system of claim 8, wherein the encrypted account update message is a Short Message Service (SMS) message.

12. The system of claim 8, wherein the broadcast system is further configured for broadcasting the Short Message Service (SMS) message over a predetermined SMS cell broadcast channel subscribed to by the group the wireless devices.

13. The system of claim 8, further comprising means for providing the group of wireless devices with a decryption key capable of decrypting the broadcast encrypted account update message.

14. The system of claim 8, wherein the server is further configured for including an identification within the encrypted account update message such that each broadcast encrypted account update message is capable of being separately identified and acted upon by the wireless devices.

15. A system for replenishing internally stored account parameters on a select group of wireless devices, comprising:
- a database containing an encryption key uniquely associated with the group of wireless devices;
- obtaining the encryption key from the database associated with the group of wireless devices;
- generating an encrypted account update message using the encryption key and at least one account parameter to be changed that includes an amount of authorization for wireless usage of the wireless device; and
- broadcasting the encrypted account update message for receipt by the group of wireless devices in order to update the internally stored account parameters within the group of wireless devices to replenish their internally stored prepaid amount of wireless authorization for usage of the wireless device, wherein the broadcast encrypted account update message is only able to be decrypted by those wireless devices within the group of wireless devices.

16. The system of claim 15, further comprising means for automatically replenishing the internally stored prepaid amount of authorization for usage of the wireless devices on a periodic basis based on internally stored rules regardless of whether the broadcast encrypted account update message is received by any of the wireless devices.

17. The system of claim 15, wherein the broadcast encrypted account update message provides the same prepaid amount of authorization for usage of the wireless device to be replenished on each wireless device in the group of wireless devices.

18. The system of claim 15, wherein the encrypted account update message is a Short Message Service (SMS) message.

19. The system of claim 15, further comprising stored instructions executable by the server processor for broadcasting the Short Message Service (SMS) message over a predetermined SMS cell broadcast channel subscribed to by the group the wireless devices.

20. The system of claim 15, further comprising stored instructions executable by the server processor for including an identification within the encrypted account update message such that each broadcast encrypted account update message is capable of being separately identified and acted upon by the wireless devices.

* * * * *